United States Patent
Davis et al.

(10) Patent No.: US 11,624,804 B2
(45) Date of Patent: Apr. 11, 2023

(54) SYSTEM AND METHOD FOR LOCATION DETERMINATION UTILIZING DIRECT PATH INFORMATION

(71) Applicant: NOKIA TECHNOLOGIES OY, Espoo (FI)

(72) Inventors: Ian Davis, Delgany (IE); Walter Etter, Ocean, NJ (US); Hong Jiang, Warren, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 17/066,057

(22) Filed: Oct. 8, 2020

(65) Prior Publication Data

US 2022/0113370 A1 Apr. 14, 2022

(51) Int. Cl.
*G01S 5/24* (2006.01)

(52) U.S. Cl.
CPC ...................... *G01S 5/24* (2013.01)

(58) Field of Classification Search
CPC .................. G01S 5/24; G01S 5/30; G01S 5/18
See application file for complete search history.

(56) References Cited

U.S. PATENT DOCUMENTS

| | | |
|---|---|---|
| 2013/0083631 A1 | 4/2013 | Harrell et al. |
| 2014/0192622 A1 | 7/2014 | Rowe et al. |
| 2019/0204408 A1 | 7/2019 | Booij |
| 2020/0110146 A1 | 4/2020 | Barker et al. |
| 2020/0136675 A1* | 4/2020 | Christoph .............. H04R 27/00 |
| 2022/0113370 A1* | 4/2022 | Davis ........................ G01S 5/18 |
| 2022/0187917 A1* | 6/2022 | Radivojevic ............ G06F 3/011 |

FOREIGN PATENT DOCUMENTS

| | | | | |
|---|---|---|---|---|
| EP | 3982146 A1 * | 4/2022 | ............... | G01S 5/24 |
| ES | 2849260 T3 * | 8/2021 | ............... | G06F 3/162 |
| GB | 2597656 A * | 2/2022 | ............... | G01S 1/752 |
| WO | WO-2018/229030 A1 | 12/2018 | | |

(Continued)

OTHER PUBLICATIONS

Extended European Search Report for European Application No. 21198704.5 dated Mar. 16, 2022, 8 pages.

(Continued)

*Primary Examiner* — Daniel Pihulic
(74) *Attorney, Agent, or Firm* — Alston & Bird LLP

(57) ABSTRACT

A system, apparatus, method and computer program product determine the location of a receiver, such as one or more sensors, carried by a device, e.g., a robot. In a method, an audio signal is received in response to a predetermined audio signal provided by at least two audio source devices. For the audio signal that is received from a respective audio source device, the method estimates a first impulse response between the respective audio source device and the receiver. For the first impulse response estimated between each respective audio source device of the at least two audio source devices and the receiver, the method removes one or more reflections from the first impulse response to create direct path information. The method also includes determining a location of the receiver based at least in part upon the direct path information.

20 Claims, 4 Drawing Sheets

(56) References Cited

FOREIGN PATENT DOCUMENTS

WO    WO-2022018324 A1 *  1/2022  ............. G01S 1/752

OTHER PUBLICATIONS

Flanagan, B., "Self Localization Using A Modulated Acoustic Chirp", The MITRE Corporation (Apr. 2007), 5 pages.
Johansson, A., "Acoustic Sound Source Localisation and Tracking in Indoor Environments", Blekinge Institute of Technology, Doctoral Dissertation Series No. 2008:05 (2008), 220 pages.
Lin et al., "Rebooting Ultrasonic Positioning Systems for Ultrasound-Incapable Smart Devices", MobiCom '19: The 25th Annual International Conference on Mobile Computing and Networking (Dec. 2018), 16 pages.
Liu et al., "Indoor Acoustic Localization: A Survey", Human-Centric Computing and Information Services (Jan. 6, 2020), 24 pages.

* cited by examiner

SYSTEM AND METHOD FOR LOCATION DETERMINATION UTILIZING DIRECT PATH INFORMATION

TECHNOLOGICAL FIELD

An example embodiment relates generally to a system, apparatus, method and computer program product for location determination and, more particularly, to a system, apparatus, method and computer program product for location, determination utilizing direct path information.

BACKGROUND

A number of applications are dependent upon the accurate determination of the location of a device, such as a device in motion. For example, autonomous and semi-autonomous agents, such as robots, are being increasingly utilized. In order to properly control and direct a robot and to facilitate the performance of the intended function of a robot, the location of the robot must be monitored in an accurate and reliable manner.

A number of the applications that are dependent upon the accurate determination of the location of a device require the device to be located within an indoor space, such as within a warehouse or other room. In order to determine the location of a device, such as a robot, within an indoor space, the robot may include one or more sensors, such as one or more radio frequency (RF)-based sensors, one or more optical, e.g., light detection and ranging (LiDAR) sensors or one or more acoustic sensors. The location of a robot may then determine based upon signals received by the sensor(s) carried by the robot in combination with the on-board telemetry of the robot and statistical processing techniques, such as Kalman and particle filters.

However, indoor localization systems, such as the systems utilized to determine the location of a robot, may be susceptible to multi-path errors. Multi-path errors are attributable to the presence of multiple propagation paths from a signal source to the one or more sensors carried by the device, e.g., robot, to be located. In this regard, reflections of the signals provided by the signal source from room boundaries, e.g., walls, ceilings and/or floors, as well as reflections from other objects within the indoor space may create multiple propagation paths to the one or more sensors carried by the device to be located. The existence of multiple propagation paths can lead to errors in the determination of the location of a device, such as a robot, particularly, but not only, if the line-of-sight between the signal source and the device is obscured.

These errors in the determination of the location may be exacerbated as the distance between the signal source and the one or more sensors carried by the device, e.g., robot, increases since the signal that follows the direct path from the signal source to the one or more sensors becomes weaker relative to the reflected paths of signals. In an effort to maintain the proximity of the signal source and the one or more sensors of the device to located, additional signal sources can be added at various locations throughout the indoor space. However, these additional signal sources increase the cost of the location system and incur additional cost and labor for their installation and maintenance.

Multi-path errors may result in errors in the location with which a device, such as a robot, is located. For example, a signal source may emit a physical, such as an acoustic, wave or an electromagnetic, such as an RF, wave that propagates to the one or more sensors carried by the device to be located. However, reflections of the waves may occur from one or more boundaries, such as the walls, the floor or ceiling, of the indoor space within which the device is located. In some instances, the reflected waves or a combination of multiple reflected waves that are received by the one or more sensors may be stronger than the waves propagating directly from the signal source to the one or more sensors, thereby potentially resulting in the reflected wave(s) being incorrectly identified to be the waves that have directly propagated from the signal source and, in turn, resulting in the location of the one or more sensors being determined incorrectly.

In order to determine the location of the one or more sensors, and, in turn, the device carrying the one or more sensors, a time of arrival (ToA) analysis or an angle of arrival (AoA) analysis may be performed. In conjunction with a ToA analysis, a location system may errantly identify one or more of the reflected waves to be representative of the direct propagation path from the signal source to the one or more sensors with the resulting time of flight of the wave(s) that has been identified being longer than if the direct propagation path had actually been followed. Similarly, in conjunction with an AoA analysis, the measured angle of a reflected wave or a combination of reflected waves may be erroneously identified to represent the angle of the wave propagating directly from the signal source to the one or more sensors carried by the device. In these instances, the incorrect distance to the signal source may be determined based upon the incorrect time of flight in a ToA analysis or the incorrect angle to the signal source may utilized in an AoA analysis such that the resulting location determined for the device, such as a robot, carrying the one or more sensors will also be incorrect. By incorrectly locating the device as a result of the reliance upon reflected waves improperly interpreted to be representative of a direct propagation path from the signal source to the one or more sensors carried by the device, the system will not be able to locate the device with both precision and certainty, thereby potentially leading to improper performance of an application by the device.

BRIEF SUMMARY

A system, apparatus, method and computer program product are provided in accordance with an example embodiment in order to determine the location of a receiver, such as one or more sensors, carried by a device, e.g., a robot, with greater certainty. In this regard, the system, apparatus, method and computer program product of an example embodiment are configured to identify the audio signals that have propagated directly from a signal source to the receiver and to rely upon these audio signals in conjunction with the determination of the location of the receiver. Thus, even in an instance in which the device which carries the receiver is disposed within an indoor space, reflections of the signals transmitted by the signal source and captured by the receiver will not appreciably impact the determination of the location of the receiver and, instead, the signals that propagate directly from the signal source to the receiver are prioritized in conjunction with the determination of the location of the receiver. As a result, the location of the receiver and, in turn from the location of a device carrying the receiver, such as a robot, may be determined with greater accuracy and confidence, even in instances in which the receiver is disposed within an indoor space, thereby permitting the device carrying the receiver to perform a desired application in a more predictable manner.

In an example embodiment, a method is provided that includes receiving, at a receiver, an audio signal in response to a predetermined audio signal provided by at least two audio source devices. For the audio signal received in response to the predetermined audio signal provided by each respective audio source device of the at least two audio source devices, the method estimates a first impulse response between the respective audio source device and the receiver based at least in part upon the audio signal received in response to a predetermined audio signal provided by the respective audio source device. For the first impulse response estimated between each respective audio source device of the at least two audio source devices and the receiver, the method removes one or more reflections from the first impulse response to create direct path information, such as by cropping the first impulse response to remove the one or more reflections. The method also includes determining a location of the receiver based at least in part upon the direct path information created from the first impulse response estimated between each respective audio source device of the at least two audio source devices and the receiver.

The method of an example embodiment also includes determining a second impulse response based at least in part upon the direct path information created from the first impulse response estimated between each respective audio source device of the at least two audio source devices and the receiver. The method of this example embodiment determines the location of the receiver by determining an angle of arrival of the audio signal based at least in part upon the second impulse response. In this example embodiment, the method may determine the second impulse response based upon a combination of the direct path information and a tonal signal at a frequency associated with the audio signal. In an example embodiment, the method removes one or more reflections from the first impulse response to create a direct path impulse response. In this example embodiment, the method also includes determining a peak of the direct path impulse response and then determining the location of the receiver by determining a time of arrival of the audio signal based at least in part upon the peak of the direct path impulse response. In an example embodiment in which a predetermined audio signal includes a chirp signal including a sine wave that is swept across frequency over time, the method receives the audio signal by receiving the audio signals in response to a plurality of chirp signals that are temporally separated by signal silence intervals. In this example embodiment, the method may estimate the first impulse response by determining a cross-correlation between the audio signal received in response to the chirp signal and a time reversal of the chirp signal.

In another example embodiment, an apparatus is provided that includes at least one processor and at least one memory including computer program code with the at least one memory and the computer program code configured to, with the at least one processor, cause the apparatus to receive an audio signal in response to a predetermined audio signal provided by at least two audio source devices. For the audio signal received in response to the predetermined audio signal provided by each respective audio source device of the at least two audio source devices, the at least one memory and the computer program code are configured to, with the at least one processor, cause the apparatus to estimate a first impulse response between the respective audio source device and the receiver based at least in part upon the audio signal received in response to the predetermined audio signal provided by the respective audio source device. For the first impulse response estimated between respective audio source device of the at least two audio source devices and the receiver, the at least one memory and the computer program code are configured to, with the at least one processor, cause the apparatus to remove one or more reflections from the first impulse response to create direct path information, such as by cropping the first impulse response to remove the one or reflections. The at least one memory and the computer program code are also configured to, with the at least one processor, cause the apparatus to determine a location of the receiver based at least in part upon the direct path information created from the first impulse response estimated between each respective audio source device of the at least two audio source devices.

The at least one memory and the computer program code are further configured to, with the at least one processor, cause the apparatus of an example embodiment to determine a second impulse response based at least in part upon the direct path information created from the first impulse response estimated between each respective audio source device of the at least two audio source devices and the receiver. In this example embodiment, the at least one memory and the computer program code are configured to, with the at least one processor, cause the apparatus to determine the location of the receiver by determining an angle of arrival of the audio signal based at least in part upon the second impulse response. The at least one memory and the computer program code may be configured to, with the at least one processor, cause the apparatus of this example embodiment to determine the second impulse response based upon a combination of the direct path information and a tonal signal at a frequency associated with the audio signal.

The at least one memory and the computer program code are configured to, with the at least processor, cause the apparatus of an example embodiment to remove one or more reflections from the first impulse response to create direct path information in the form of a direct path impulse response. In this example embodiment, the at least one memory and the computer program code are further configured to, with the at least one processor, cause the apparatus to determine a peak of the direct path impulse response and to determine the location of the receiver by determining a time of arrival of the audio signal based at least in part upon the peak of the direct path impulse response. In an example embodiment in which the predetermined audio signal includes a chirp signal including a sine wave signal that is swept across frequency over time, the at least one memory and the computer program code are configured to, with the at least one processor, cause the apparatus to receive the audio signal by receiving audio signals in response to a plurality of chirp signals that are temporally separated by signal silence intervals. In this example embodiment, the at least one memory and the computer program code may be configured to, with the at least one processor, cause the apparatus to estimate the first impulse response by determining a cross-correlation between the audio signal received in response to the chirp signal and a time reversal of the chirp signal.

In an additional example embodiment, an apparatus is provided that includes means for receiving an audio signal in response to a predetermined audio signal provided by at least two audio source devices. For the audio signal received in response to the predetermined audio signal provided by each respective audio source device of the at least two audio source devices, the apparatus includes means for estimating a first impulse response between the respective audio source device and a receiver based at least in part upon the audio signal received in response to a predetermined audio signal provided by the respective audio source device. For the first impulse response estimated between each respective audio source device of the at least two audio source devices and the receiver, the apparatus includes means for removing one or more reflections from the first impulse response to create direct path information, such as means for cropping the first impulse response to remove the one or more reflections. The apparatus also includes means for determining a location of the receiver based at least in part upon the direct path information created from the first impulse response estimated between each respective audio source device of the at least two audio source devices and the receiver.

The apparatus of an example embodiment also includes means for determining a second impulse response based at least in part upon the direct path information created from the first impulse response estimated between each respective audio source device of the at least two audio source devices and the receiver. In this example embodiment, the means for determining the location of the receiver includes means for determining an angle of arrival of the audio signal based at least in part upon the second impulse response. In this example embodiment, the apparatus may include means for determining the second impulse response based upon a combination of the direct path information and a tonal signal at a frequency associated with the audio signal. In an example embodiment, the apparatus includes means for removing one or more reflections from the first impulse response to create a direct path impulse response. In this example embodiment, the apparatus also includes means for determining a peak of the direct path impulse response and the means for determining the location of the receiver includes means for determining a time of arrival of the audio signal based at least in part upon the peak of the direct path impulse response. In an example embodiment in which a predetermined audio signal includes a chirp signal including a sine wave that is swept across frequency over time, the apparatus includes means for receiving the audio signals in response to a plurality of chirp signals that are temporally separated by signal silence intervals. In this example embodiment, the means for estimating the first impulse response may include means for determining a cross-correlation between the audio signal received in response to the chirp signal and a time reversal of the chirp signal.

In a further example embodiment, a computer program product is provided that includes at least one non-transitory computer-readable storage medium having computer-executable program code instructions stored therein with the program code instructions being configured to receive an audio signal in response to a predetermined audio signal provided by at least two audio source devices. For the audio signal received in response to the predetermined audio signal provided by each respective audio source device of the at least two audio source devices, program code instructions are provided that are configured to estimate a first impulse response between the respective audio source device and a receiver based at least in part upon the audio signal received in response to the predetermined audio signal provided by the respective audio source device. For the first impulse response estimated between each respective audio source device of the at least two audio source devices and the receiver, program code instructions are also provided that are configured to remove one or more reflections from the first impulse response to create direct path information, such as by cropping the first impulse response to remove the one or more reflections. Program code instructions are additionally provided that are configured to determine a location of the receiver based at least in part upon the direct path information created from the first impulse response estimated between each respective audio source device of the at least two audio source devices and the receiver.

The computer-readable storage medium of an example embodiment also includes program code instructions configured to determine a second impulse response based at least in part upon the direct path information created from the first impulse response estimated between each respective audio source device of the at least two audio source devices and the receiver. In this example embodiment, the program code instructions configured to determine the location of the receiver include program code instructions configured to determine an angle of arrival of the audio signal based at least in part upon the second impulse response. In this example embodiment, the program code instruction configured to determine the second impulse response may include program code instructions configured to determine the second impulse response based upon a combination of the direct path information and a tonal signal at a frequency associated with the audio signal.

The program code instruction configured to remove one or more reflections from the first impulse response to create direct path information may include program code instructions configured to remove one or more reflections from the first impulse response to create a direct path impulse response. In this example embodiment, the computer-readable storage medium may also include program code instructions configured to determine a peak of the direct path impulse response and the program code instructions configured to determine the location of the receiver may include program code instructions configured to determine a time of arrival of the audio signal based at least in part upon the peak of the direct path impulse response. In an example embodiment in which the predetermined audio signal includes a chirp signal including a sine wave signal that is swept across frequency over time, the program code instructions configured to receive the audio signal may include program code instructions configured to receive audio signals in response to a plurality of chirp signals that are temporally separated by signal silence intervals. In this example embodiment, the program code instruction configured to estimate the first impulse response may include program code instructions configured to determine a cross-correlation between the audio signal received in response to the chirp signal and a time reversal of the chirp signal.

In yet another example embodiment, a system is provided that includes a plurality of audio source devices. Each audio source device is configured to transmit a predetermined audio signal. The system also includes a receiver configured to receive an audio signal in response to the predetermined audio signals provided by the plurality of audio source devices. The system further includes at least one processor configured to estimate a first impulse response between each respective audio source device and receiver based at least in part upon the audio signal received in response to the predetermined audio signals. The at least one processor is also configured to remove one or more reflections from the first impulse response to create direct path information and to determine a location of the receiver based at least in part upon the direct path information.

In an embodiment in which the predetermined audio signal includes a chirp signal including a sine wave that is swept across frequency over time, each audio source device may be configured to transmit a plurality of chirp signals that are temporally separated by signal silence intervals. In this example embodiment, the chirp signal may include an acoustic signal or an ultrasonic signal. The at least one processor of an example embodiment is configured to determine a second impulse response based at least in part upon the direct path information. In this example embodiment, the at least one processor is also configured to determine the location of the receiver by determining an angle of arrival of the audio signal based at least in part upon the second impulse response. In this example embodiment, the receiver may include a plurality of sensors with each sensor configured to receive the audio signal in response to the predetermined audio signals provided by the plurality of audio source devices. In an example embodiment, the at least one processor is configured to cause the apparatus to remove one or more reflections from the first impulse response to create direct path information in the form of a direct path impulse response. In this example embodiment, the at least one processor is further configured to cause the apparatus to determine a peak to the direct path impulse response and the at least one processor is configured to cause the apparatus to determine the location of the receiver by determining a time of arrival of the audio signal based at least in part upon the peak of the direct path impulse response.

BRIEF DESCRIPTION OF THE DRAWINGS

Figure 1:
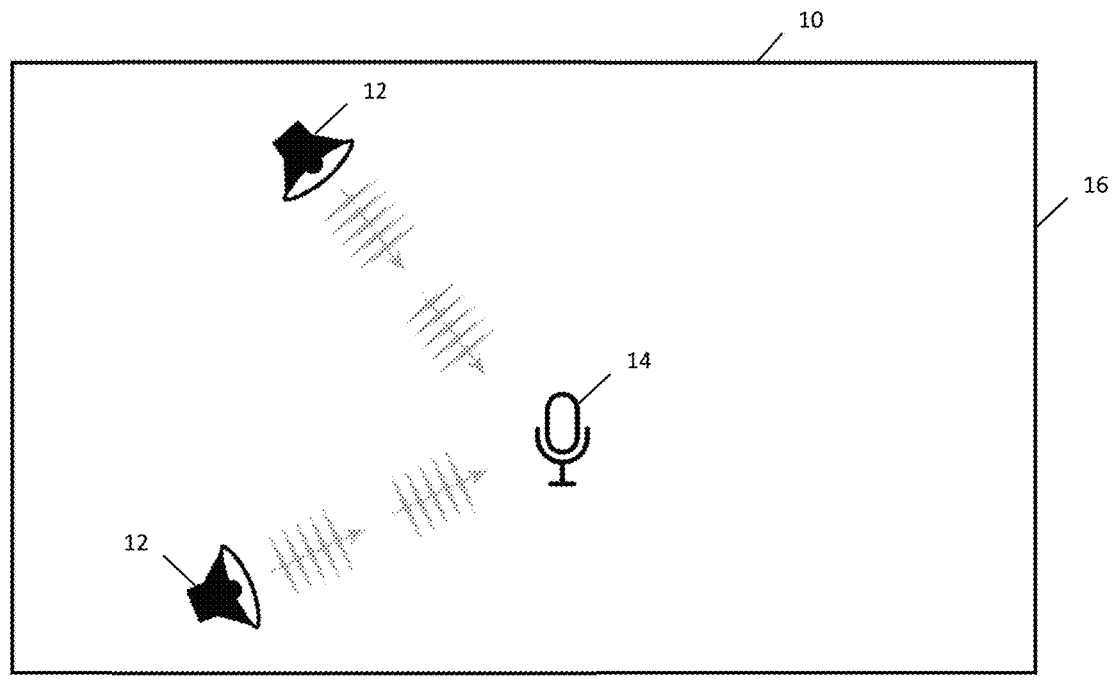
Figure 2:
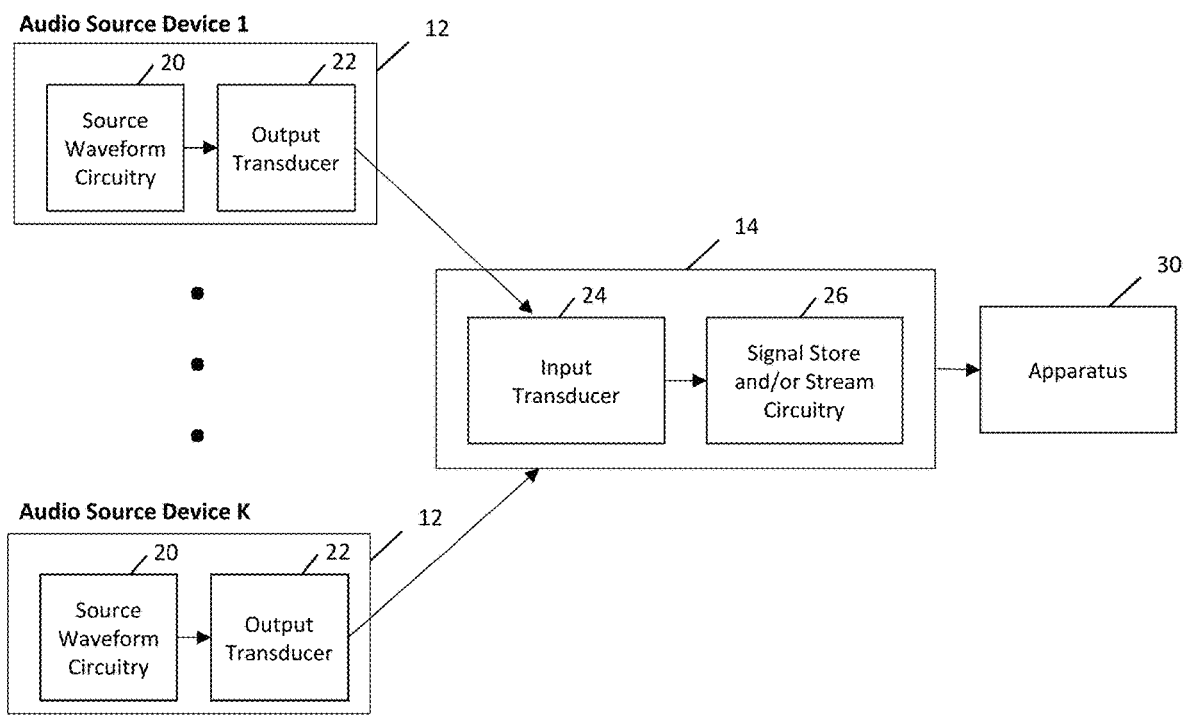
Figure 3:
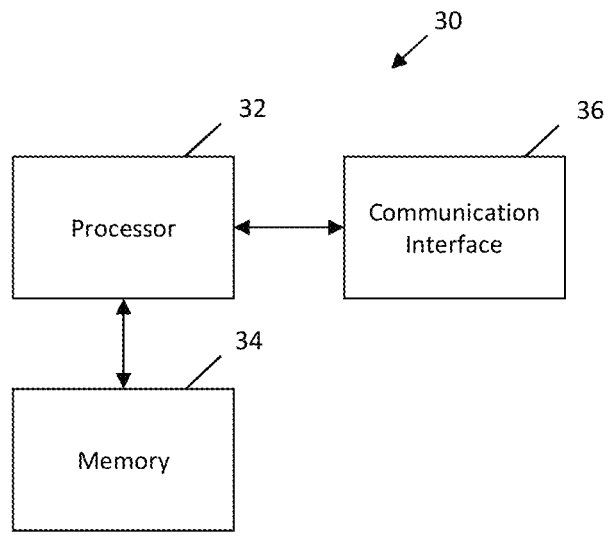
Figure 4:
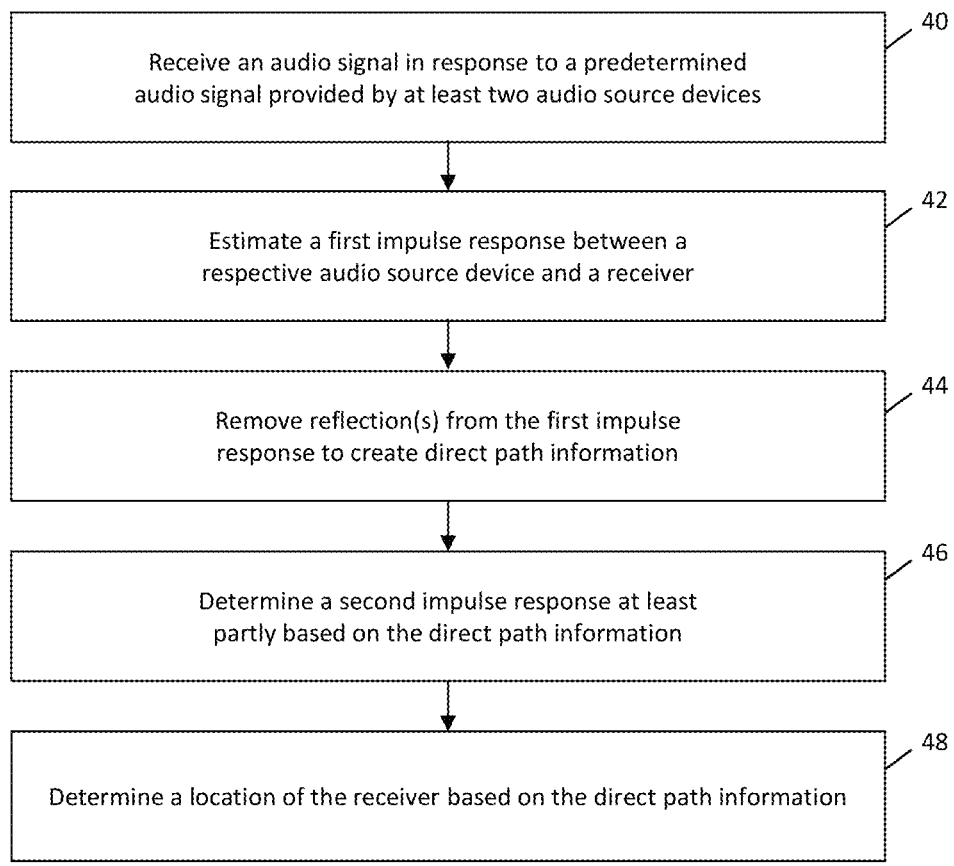
Figure 5:
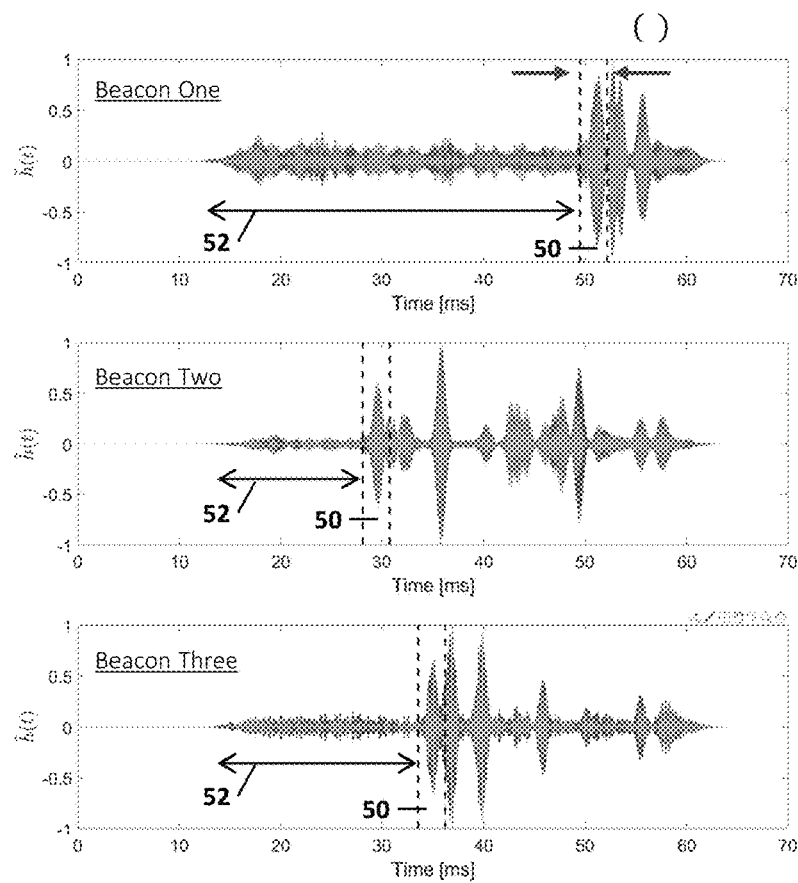
Figure 6A:
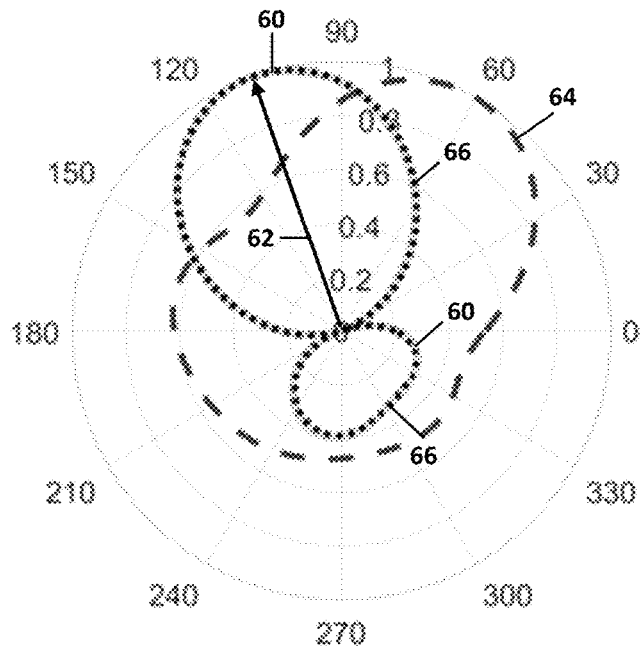
Figure 6B:
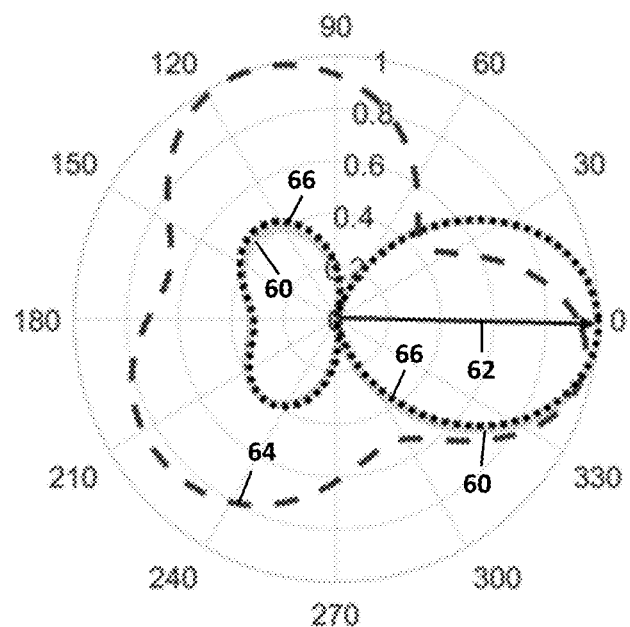
Figure 6C:
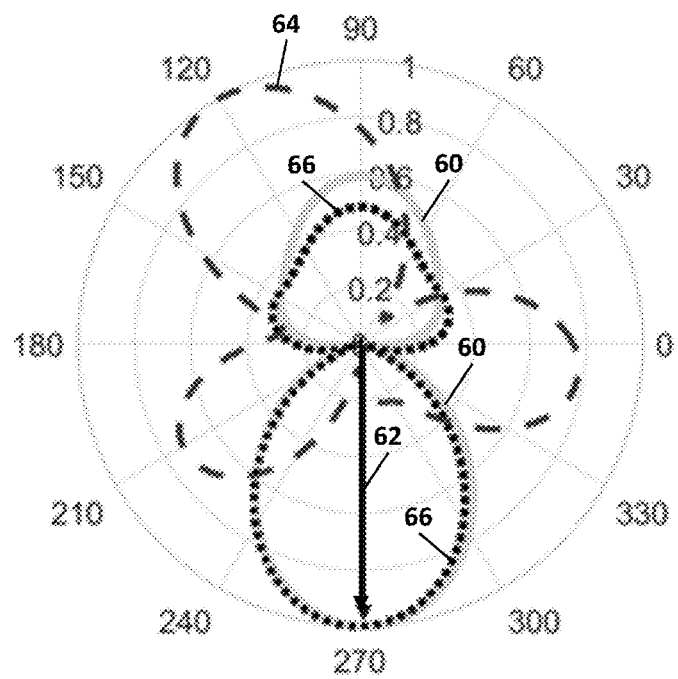

Having thus described certain example embodiments of the present disclosure in general terms, reference will hereinafter be made to the accompanying drawings, which are not necessarily drawn to scale, and wherein:

FIG. 1 illustrates an indoor space having two audio source devices and a receiver disposed therewithin;

FIG. 2 is a block diagram of a system configured to determine the location of a device in accordance with an example embodiment based upon predetermined audio signals transmitted by a plurality of audio source devices;

FIG. 3 is a block diagram of an apparatus that may be specifically configured in accordance with an example embodiment in order to determine the location of a receiver based upon predetermined audio signals transmitted by a plurality of audio source devices;

FIG. 4 is a flow chart of the operations performed, such as by the apparatus of FIG. 3, in accordance with an example embodiment;

FIG. 5 illustrates the removal of one or more reflections by cropping the first impulse responses of first, second and third audio source devices in accordance with an example embodiment; and FIG. 6A-6C are graphical representations of a location determined in accordance with an example embodiment relative to a true source direction and in comparison to a direction determined utilizing an angle of arrival analysis with continuous tones and without any attempt to remove reflections.

DETAILED DESCRIPTION

Some embodiments of the present disclosure will now be described more fully hereinafter with reference to the accompanying drawings, in which some, but not all, embodiments of the disclosure are shown. Indeed, some embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

A system, apparatus, method and computer program product are provided in accordance with an example embodiment which utilize physical waves, such as audio signals, in order to determine the location of a device. Any of a wide variety of devices may be located including, for example, robots or other autonomous or semi-autonomous agents configured to move or otherwise be relocated. Other devices that may be located include, for example, mobile terminals, such as a mobile telephone, a smartphone, a laptop computer, a tablet computer or other mobile computing device, or devices worn by an individual, such as a smart device, e.g., a smart watch, a health monitor, a personal navigation system or the like. In an example embodiment, the system, apparatus, method and computer program product are configured to determine the location of a device within an indoor space, such as within a warehouse, a room or other indoor facility, as a result of being configured to focus upon the audio signals that propagate directly from a plurality of audio sources to the device with less or no consideration of audio signals that reflect from one or more surfaces, such as the walls, ceiling or floor or other objects within the indoor space. However, the system, apparatus, method and computer program product of other example embodiments may be configured to determine the location of a device outdoors or in other environments in which the audio signals may be reflected from one or more surfaces or objects.

FIG. 1 depicts an example of an indoor space 10 in which a system of an example embodiment may be deployed. In this example embodiment, a plurality of audio source devices 12 are provided, each of which is configured to provide audio signals. The system of FIG. 1 also includes a receiver 14 configured to receive the audio signals transmitted by the plurality of audio source devices. The receiver may be carried by the device to be located or may otherwise have a predefined positional relationship to the device to be located. As such, by determining the location of the receiver, the location of the device may be correspondingly determined, such as by either being co-located or being in a predefined positional relationship relative to the receiver.

Although the system of FIG. 1 includes two audio source devices 12, the system may include any number of audio source devices, such as K audio source devices. The number of audio source devices may depend upon the environment in which the audio source devices and the receiver 14 are deposed. With respect to an indoor space 10, the number of audio source devices may be dependent upon the size of the indoor space with larger indoor spaces sometimes utilizing a larger number of audio source devices then smaller indoor spaces. While two audio source devices may be sufficient in order to determine the location of a device, a system may include a third audio source device in order to identify the pose/orientation of the device along with the location of the device. Further, the system may include a fourth audio source device in order to estimate the pose/orientation of the device as well as the three dimensional (3D) position of the device.

The audio source devices 12 may be positioned at any of a variety of locations within the space within which the device is to be located. In one embodiment, however, the audio source devices may be placed proximate to, such as adjacent to, a boundary 16, such as the walls, of an indoor space 10 within which the device is to be located. The locations of the audio source devices are known in advance, that is, the locations of the audio source devices are pre-defined, such that the locations of the audio signal sources may be utilized in order to determine the location of the receiver 14 and, in turn, the device to be located.

Various types of audio source devices 12 may be employed, although the audio source devices of a system are generally the same type so as to transmit the same type of audio signals. One example of an audio source device is depicted in FIG. 2 and includes circuitry 20, such as a Raspberry Pi 0 single-board computer developed by the Raspberry Pi Foundation, configured to generate a source waveform $x_k(t)$ and a transducer 22, such as a piezoelectric or electromagnetic transducer, for generating the audio signals in response to the source waveform. In some example embodiments, the audio source device may also include an amplifier configured to amplify the source waveform prior to provision of the source waveform to the transducer. In other example embodiments, the audio source devices may not be completely independent of one another and, instead, each audio source device may include a respective speaker or transducer driven by a single signal source, e.g., an amplifier.

The audio source devices 12 are configured to generate and transmit audio signals having a narrow bandwidth while balancing the improved temporal resolution of the estimated impulse response, e.g., a sharper peak of the estimated impulse response, provided by a wider bandwidth with the preference to avoid overlap with the audio signals emitted by other audio source devices of a system including multiple audio source devices. In one example embodiment, however, the audio source devices generate and transmit audio signals having a bandwidth of up to several kHz, such as a bandwidth of 1000 Hz centered about an ultrasonic frequency in the range of 19 kHz to 23.5 kHz. Each audio source device is configured to transmit audio signals in a different frequency band such that the audio signals transmitted by each audio source device are mathematically orthogonal. In an example embodiment, the audio source devices are configured to generate a chirp signal and, more particularly, a plurality of intermittent chirp signals temporally separated by signal silence intervals. Thus, an audio source device of this example embodiment is configured to generate a chirp signal and to then be silent during a signal silence interval prior to transmitting another chirp signal. The chirp signal is a swept-sine wave signal in a narrow bandwidth in which a sine wave is swept across frequency with time. In this regard, the chirp signal $x_k(t)$ that is emitted by an audio source device may be defined as follows: $x_k(t)=\sin(2\pi f(t)t)$. In this example embodiment, the time-based frequency function $f(t)$ may be defined in various manners including, for example as $$f(t) = \left(\frac{f_1 - f_0}{T}\right)t + f_0$$

in an embodiment in which the audio source device emits a linear chirp signal or as $$f(t) = \left(\frac{f_1}{f_0}\right)^{\frac{1}{t}} + f_0$$

in an embodiment in which the audio source device emits a logarithmic chirp signal. In relation to the foregoing examples of time-based frequency functions, $f_1$ and $f_0$ are upper and lower frequency limits, respectively, of the range of frequencies over which the sine wave is swept (such that $f_1-f_0$ defines the bandwidth of the chirp signal) and T is the length of the time period during which the sine wave is swept across the range of frequencies.

In an example embodiment, the audio source device 12 may also include a filter configured to filter the chirp signal. For example, the filter may be configured to apply a window function, such as a Hann, Hamming or Blackman window function, to smooth the amplitude of the chirp signal and to remove discontinuities at the ends of the chirp signal. By filtering the chirp signals, audible popping may be reduced or eliminated when the audio source device is triggering the chirp signals.

As noted above, each audio source device 12 of an example embodiment is configured to emit a plurality of chirp signals spaced apart by a signal silence interval. In an example embodiment, the signal silence interval between the chirp signals is sufficiently long such that the room impulse response including the reflections from one chirp signal, such as from the boundaries 16 of the indoor space 10 within which the audio source devices and the receiver 14 are located, significantly dissipate or are eliminated prior to the emission of the next chirp signal. The length of time of the signal silence interval may therefore be based upon the reverberation characteristics of the indoor space, such as may be determined by audio analysis or video analytics of the likely reverberant behavior based upon an analysis of the size of the indoor space and the material that forms the boundaries of the indoor space. By way of example, a signal silence interval of fifty milliseconds (ms) may be sufficient to ensure that reflections in the ultrasonic frequency range decay by over 20 dB in an indoor space of size 10 meters by 7 meters. However, in indoor spaces of different sizes or having boundaries formed of different materials or otherwise having different reverberation characteristics, the signal silence interval may be of other lengths so as to acoustically separate the chirp signals generated by an audio source device. For example, in other settings, chirp signals having a duration of about 11 ms are separated by signal silence intervals having a duration of about 160 ms.

As shown in FIG. 2, the receiver 14 is configured to receive the audio signals transmitted by the plurality of audio source devices 12. In an example embodiment, the receiver includes one or more microphones or other audio sensors for receiving the audio signals transmitted by the plurality of audio source devices. As such, reference herein to the receipt of audio signals by the receiver includes, in at least some embodiments, the receipt of audio signals by the microphone(s) or other audio sensor(s) of the receiver. In an example embodiment in which the location of the device is to be determined based upon a time of arrival analysis, the receiver may include only a single microphone or other audio sensor. Alternatively, in an embodiment in which the location of the device is to be determined based upon an angle of arrival analysis, the receiver may include two or more microphones or other audio sensors.

Although the receiver 14 may be configured in any of a variety of different manners, the receiver of an example embodiment depicted in FIG. 2 may include an input transducer 24, such as a microphone or other audio sensor, and circuitry 26, such as a Raspberry Pi 3 or 4 single-board computer developed by the Raspberry Pi Foundation, configured to store and/or stream the received signals as described below. In some embodiments, the receiver also includes an apparatus configured to analyze the received signals and to determine the location of the receiver and, in turn, the device, while in other embodiments including the embodiment depicted in FIG. 2, the audio signals or a representation thereof are provided, e.g., streamed, to an apparatus 30 that is separate from the receiver so as to analyze the audio signals received by the receiver. Based upon the audio signals received by the receiver, the location of the receiver and, in turn, the device may be determined, such as based upon an angle of arrival analysis, a time of arrival analysis, a time delay of arrival analysis, etc.

The apparatus 30 configured to determine the location of the receiver 14 and, in turn, the device with which the receiver is associated may be embodied in a variety of different manners. For example, the apparatus may be embodied by the receiver or may be embodied by a computing device separate from, but in communication with the receiver. In an embodiment in which the apparatus is separate from, but in communication with the receiver, the computing device that embodies the apparatus may be a personal computer, a server, a laptop computer, a mobile computing device or any other type of computing device. As shown in FIG. 3, the apparatus of an example embodiment includes, is associated with or is in communication with a processor 32, a memory 34 and a communication interface 36. The processor may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

As noted above, the apparatus 30 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 32 may be embodied in a number of different ways. For example, the processor may be embodied one or more of various hardware processing means such as processing circuitry, a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as processing circuitry including, but not limited to an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image or video processing system) configured to employ one embodiment by further configuration of the processor by instructions for performing the algorithms and/or operations described herein. The processor may include, among other things, a clock, an arithmetic logic unit (ALU) and logic gates configured to support operation of the processor.

The communication interface 36 may be any means such as a device or circuitry embodied in either hardware or a combination of hardware and software that is configured to receive and/or transmit data, including audio signals or data representative of audio signals. For example, the communication interface may be configured to communicate with the receiver 14 in some embodiments in which the apparatus is separate from the receiver. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 4, the operations performed, such as by the apparatus 30, in order to determine the location of the receiver 14 and, in turn, the device with which the receiver is associated, are depicted in accordance with one example embodiment. As described above, the receiver 14 is configured to receive audio signals in response to the predetermined audio signals provided by at least two audio source devices 12. Thus, the audio signals received by a receiver include a combination of audio signals from each of the plurality of audio source devices within the space. Thus, the audio signals received by the receiver may be defined as:

$$y_m(t) = \sum_{k=1}^{K} (h_{k,m}(t) * x_k(t)) + n_m(t)$$

in which $h_{k,m}(t)$ is the impulse response between a respective audio source device k and the receiver m (or a microphone or other audio sensor m of the receiver) and $n_m(t)$ is noise at the receiver m (or a microphone or other audio sensor m of the receiver) that is not associated with any of the audio source devices. The audio signals received by the receiver are, in turn, provided to the apparatus. Thus, the apparatus includes means, such as the communication interface 36, the processor 32, processing circuitry or the like, for receiving an audio signal, such as from the receiver, in response to the predetermined audio signal provided by at least two audio source devices. See block 40 of FIG. 4. For the audio signal received in response to the predetermined audio signal provided by each respective audio source device 12 of the at least two audio source devices, the apparatus 30 of an example embodiment includes means, such as the processer 32, processing circuitry or the like, for estimating a signal onset time and, in one embodiment, for estimating a first impulse response between the respective audio source device and the receiver 14 based at least in part upon the audio signal received in response to the predetermined audio signal provided by the respective audio source device. See block 42. Thus, the apparatus, such as the processor, is configured to estimate a first impulse response for each respective audio source device. Although the first impulse response may be estimated in various manners, the apparatus, such as the processor, of an example embodiment in which the predetermined audio signal transmitted by the respective audio source device is a chirp signal comprising a sine wave signal that is swept across frequency over time, the apparatus, such as the processor, may be configured to estimate the first impulse response by determining a cross-correlation between the audio signal received in response to the chirp signal and a time reversal of the chirp signal. In this example embodiment, the first impulse response that is estimated for each audio source device k and receiver (or microphone or audio sensor of the receiver) m may be defined as: $\tilde{h}_{m,k}(t)=y_m(t)*x_k(-t)$ wherein f(−t) denotes a time reversal of the chirp signal.

For the first impulse response estimated between each respective audio source device 12 of the at least two audio source devices and the receiver 14, the apparatus 30 of an example embodiment includes means, such as the processor 32, processing circuitry or the like, for removing one or more reflections from the first impulse response to create direct path information. See block 44 of FIG. 4. The direct path information defines a direct path impulse response such that the removal of the one or more reflections from the first impulse response to create the direct path information also creates the direct path impulse response for signals propagating directly from the respective audio source device to the receiver without reflection. The apparatus, such as the processor, may be configured to remove all of the reflections from the first impulse response such that only direct path information remains. By removing one or more reflections from the first impulse response, the contributions to the first impulse response attributable to reflections of the audio signals, such as from the boundaries 16 of the space within which the receiver and, in turn, the device is disposed may be eliminated. By removing the reflections from the first impulse response, the direct path information that remains is representative of the audio signals that propagate directly from the respective audio source device to the receiver without reflection, such as without reflection from a boundary of the space within which the receiver and, in turn, the device is disposed.

The apparatus 30, such as the processor 32, may be configured to remove the one or more reflections from the first impulse response in any of a variety of different manners. In an example embodiment, however, the apparatus, such as the processor, is configured to remove the one or more reflections from the first impulse response by cropping the first impulse response. In this regard, the apparatus, such as the processor, is configured to crop the first impulse response such that the portion of the first impulse response that remains following cropping of the first impulse response represents the direct path impulse response and does not include information or at least includes less information regarding reflections, such as from the boundaries 16 of the space within which the receiver 14 and, in turn, the device is located.

By way of example, FIG. 5 depicts the first impulse responses generated by the predetermined audio signals transmitted by first, second and third audio source devices 12 and received by the receiver 14. Each first impulse response includes not only direct path information indicative of these signals that have propagated along a direct path, without reflection, from the respective audio source device to the receiver, but also information regarding signals that have reflected, such as from the boundaries 16 of the space within which the receiver is disposed. In order to remove at least some, if not all, of the reflections from the first impulse response, the first impulse response is cropped such that following cropping, only that portion of the first impulse response from a period of time that is designated as 50 remains. This remaining portion of the first impulse response includes the direct path information indicative of signals that have propagated directly, without reflection, from respective audio source device to the receiver.

The apparatus 30, such as the processor 32, may be configured to crop the first impulse response so as to create the direct path information in various manners. In one embodiment in which the signals received by the receiver 14 from a respective audio source device 12 include an initial segment 52 with signals having a relatively small amplitude, such as the residual signals from a prior chirp signal, followed by a plurality of periods of time, each of which includes a primary pulse having a substantial amplitude and one or more secondary pulses. The pulses within each different period of time represent signals that have followed a different path of propagation from the respective audio source device to the receiver, such as a direct path in relation to the initial period of time 50 or a reflected path in relation to subsequent periods of time. In order to crop the first impulse response so as to retain the direct path information, the apparatus, such as the processor, of this example embodiment is configured to crop the first impulse response so as to retain the signals within the first period of time, but to eliminate the signals within the initial segment and the signals within the other, subsequent periods of time that are representative of reflections from the boundaries 16 of the space within which the receiver is disposed.

By way of example, but not of limitation, the apparatus 30, such as the processor 32, may be configured to crop the direct-path impulse by searching for and identifying the first peak in the direct impulse response, such as the first peak that exceeds a predefined threshold. The predefined threshold may have a value that is greater than the relatively small amplitude of the signals within the initial segment 52. In an example in which the first peak is detected at temporal position p, the apparatus, such as the processor, can be configured to define a window around the peak from p−k/B to p+k/B with the signals within the window being retained. In this example, B is the bandwidth of the chirp signal or other predetermined audio signal emitted by the audio source device. In this regard, the bandwidth B of an example embodiment can be defined as $B=f_2-f_1$. In the foregoing equation, k is defined as a constant that sizes the window, such as 2 in one example embodiment.

As noted above, the apparatus 30, such as the processor 32, may be configured to remove all of the reflections or some, but not all of the reflections. In an example in which the apparatus, such as the processor, is configured to remove some of the reflections, the early reflections may be removed since the early reflections may more greatly degrade the accuracy with which the position of the direct path impulse is determined, while at least some of the later reflections may not be removed and may, instead, remain since the later reflections are generally of lower amplitude and less correlated to the chirp signal so as not to degrade the accuracy with which the position of the direct path impulse is determined as much in comparison to the early reflections.

The amount of the reflections that are removed may be at least partially dependent upon the duration of an analysis window that is defined based upon the timing with which a chirp signal is repeated by an audio source device 12. For localization, frequent updates as to the position of the receiver 14 are desirable with the repetition rate of the chirp signals defining the frequency with which the position of the receiver can be determined. For example, a chirp signal with a duration of 60 ms that is repeated every 180 ms allows for the position of the receiver to be updated with a frequency of 5.5 Hz. In this example, the repetition rate of the chirp signals defines an analysis window of 180 ms equal to the period with which the chirp signals are repeated which, in turn, defines the first impulse response to have a length of 180 ms including an unknown length of a preceding tail. Thus, the apparatus, such as the processor, may be configured to remove any reflections within the analysis window including the early reflections represented by the initial segment, but other reflections that arrive outside of the analysis window are not removed. In order to remove these additional reflections, the analysis window must be enlarged by increasing the temporal spacing between two consecutive chirp signals, which results in less frequent position updates.

Although the direct path information may be created by cropping the first impulse response, the apparatus 30, such as the processor 32, may be configured to create direct path information in other manners. For example, the direction path information may be information regarding the first impulse response, such as the location of the direct path impulse peak, the magnitude of the direct path impulse peak and optionally the quality or sharpness of the direct path impulse peak, such as in terms of the temporal width of the direct path impulse peak.

In an example embodiment, the apparatus 30 also include means, such as the processor 32, processing circuitry or the like, for determining a second impulse response based at least in part upon the direct path information created from the first impulse response that has been estimated between each respective audio source device 12 of the at least two audio sources devices and the receiver 14. See block 46 of FIG. 4. The apparatus, such as the processor, may be configured to determine the second impulse response in various manners. In an example embodiment, however, the apparatus, such as the processor, is configured to determine the second impulse response based upon a combination of the direct path information and a tonal frequency at a frequency associated with the audio signal, such as a frequency over which a sine wave is swept in the generation of a chirp signal. The direct path information and the tonal signal may be combined in various manners. In an example embodiment, however, the apparatus, such as the processor, is configured to combine the direct path information and the tonal signal as follows: $\tilde{y}_{k,m}(t)=s_k(t)*\tilde{h}_{k,m,trunc}(t)$ wherein $\tilde{h}_{k,m,trunc}(t)$ is the direct path impulse response in the form of a truncated version of the first impulse response following cropping the direct path information therefrom and $s_k(t)$ is an ultrasonic tonal frequency at any frequency in the band of the original chirp signal $x_k(t)$.

As shown in block 48 of FIG. 4, the apparatus 30 of an example embodiment also includes means, such as the processor 32, processing circuitry or the like, for determining a location of the receiver 14 and, in turn, the device associated with the receiver, based at least in part upon the direct path information, such as the direct path impulse response, created from the first impulse response estimated between each respective audio source device 12 of the at least two audio source devices and the receiver. The apparatus, such as the processor, may be configured to determine the location of the receiver in various manners. For example, the apparatus, such as the processor, may be configured to determine the location based upon an angle of arrival analysis, a time of arrival analysis or a time delay of arrival analysis or a combination thereof.

In an example embodiment in which the location of the receiver 14 is determined based upon an angle of arrival analysis, the apparatus 30, such as the processor 32, of an example embodiment is configured to determine the angle of arrival of the audio signal based at least in part upon the second impulse response. By performing the angle of arrival analysis based upon the second impulse response that contains the direct path information of signals propagating from a respective audio source device 12 to the receiver 14, the angle of arrival analysis is performed without cross-talk or signal interference between audio source devices and with the reflections, such as from boundaries 16 of the space within which the receiver is disposed, suppressed. Based upon the predefined locations of the audio source devices and the phase difference of the audio signals received from the respective audio source devices, the apparatus, such as the processor, is configured to determine the location of the receiver utilizing an angle of arrival analysis, such as by utilizing the multiple signal classification (MUSIC) algorithm. However, the apparatus, such as the processor, may be configured to utilize other angle of arrival algorithms in other embodiments including various triangulation algorithms.

In another embodiment, the apparatus 30, such as the processor 32, is configured to determine the location of the receiver 14 utilizing a time of arrival analysis. In this example embodiment, the apparatus, such as the processor, is configured to determine the peak of the direct path impulse response, that is, the portion of the first impulse response that remains after having removed the reflections. The peak of the direct path impulse response represents the peak of the signals received directly, without reflection, from the respective audio source device 12 by the receiver. In this example embodiment, the apparatus, such as the processor, is configured to determine the location of the receiver by determining the time of arrival of the audio signal based at least in part upon the peak of the direct path impulse response. Based upon the known locations of the plurality of audio source devices and the time required for the signals to propagate directly from the respective audio source devices to the receiver as well as the predefined speed of the audio signals within the environment, the apparatus, such as the processor, is configured to determine the location of the receiver and, in turn, the device associated therewith.

By removing the reflections from the first impulse response, the system, apparatus 30, method and computer program product of an example embodiment ensure that the reflected signals due to multipath propagation do not adversely affect the location determined for the receiver 14. As a result, the location of the receiver maybe determined with greater accuracy even as the distance between the audio source devices 12 and the receiver becomes greater since the contributions of the reflected signals that may overwhelm the direct path contribution to the received signals in conventional location techniques are removed by the system, apparatus, method and computer program product of an example embodiment. Thus, the system, apparatus, method and computer program product of an example embodiment can provide for the accurate determination of the location of a receiver with less hardware and less installation and maintenance costs by reducing or eliminating the additional audio source devices that might otherwise be installed in an effort to reduce the distance between the audio source devices and the receiver within a space. Further, the reliance of the system, apparatus, method and computer program product of an example embodiment upon short bursts of sound, such as chirp signals, from the audio source devices of an example embodiment may reduce the energy requirements by only emitting sound for a small percentage of the overall period, such as less than 10% and, in one example embodiment 6.25% of the overall period, in comparison to techniques utilizing audio source devices that generate sound or other signals on a continuous basis.

By way of example of the improved localization provided by the removal of reflections in accordance with an example embodiment, FIGS. 6A, 6B and 6C depict the results of three simulations. In a first simulation depicted in FIG. 6A, the probable location of a receiver determined based upon an angle of arrival analysis was estimated for an ideal room having no reflections, that is, an anechoic chamber, utilizing tones to be within a region outlined by solid line 60. As shown, this region includes and is largely centered about the actual direction to the audio source device designated by the arrow 62. This same simulation was then repeated utilizing the same audio source device and receiver locations, but with reflections from the boundaries of the room, such as the walls, floor and ceiling, permitted. In this simulation, the reverberation time was 400 milliseconds and a reflection coefficient of 90% was defined for the boundaries of the room. An angle of arrival analysis was performed utilizing continuous tones without any attempt to remove reflected signals with the resulting location of the receiver determined to be within a region outlined by long dashes 64. As shown, the negative impact of the reflections upon the determination of the location of the receiver is evidenced by the significant differences between the region defined for the ideal room of the same size and shape. The simulation was again repeated utilizing the technique of an example embodiment in which the reflections from the boundaries of the space were removed, thereby relying upon the direct path information for the determination of the location of the receiver. The region identified for the location of the receiver once the reflections have been removed is outlined by the short dashes 66 and is more accurate as evidenced by its substantial similarity with the region defined for an ideal room of the same size and shape. FIGS. 6B and 6C illustrate similar results for audio source devices positioned at different relative locations with respect to a receiver.

As evidenced by FIGS. 6A, 6B and 6C, the system, apparatus 30, method and computer program product determine the location of a receiver 14, such as one or more sensors, carried by a device, e.g., a robot, with greater accuracy and confidence. As a result of the more accurate determination of the location, the device carrying the receiver may perform a desired application in a more predictable manner even in instances in which the receiver is disposed within an indoor space bounded by reflective surfaces.

FIG. 4 illustrates a flowchart depicting methods according to a certain example embodiment. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present disclosure and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, at a receiver, an audio signal in response to a predetermined audio signal provided by at least two audio source devices, wherein receiving the audio signal comprises receiving audio signals from the at least two audio source devices with the audio signals being separated by a silence interval;
   for the audio signal received in response to the predetermined audio signal provided by each respective audio source device of the at least two audio source devices, estimating a first impulse response between the respective audio source device and the receiver based at least in part upon the audio signal received in response to the predetermined audio signal provided by the respective audio source device;
   for the first impulse response estimated between each respective audio source device of the at least two audio source devices and the receiver, removing one or more reflections from the first impulse response to create direct path information; and
   determining a location of the receiver based at least in part upon the direct path information created from the first impulse response estimated between each respective audio source device of the at least two audio source devices and the receiver.

2. A method according to claim 1, further comprising determining a second impulse response based at least in part upon the direct path information created from the first impulse response estimated between each respective audio source device of the at least two audio source devices and the receiver, wherein determining the location of the receiver comprises determining an angle of arrival of the audio signal based at least in part upon the second impulse response.

3. A method according to claim 2, wherein determining the second impulse response comprises determining the second impulse response based upon a combination of the direct path information and a tonal signal at a frequency associated with the audio signal.

4. A method according to claim 1, wherein removing one or more reflections from the first impulse response to create direct path information comprises removing one or more reflections from the first impulse response to create a direct path impulse response, wherein the method further comprises determining a peak of the direct path impulse response, and wherein determining the location of the receiver comprises determining a time of arrival of the audio signal based at least in part upon the peak of the direct path impulse response.

5. A method according to claim 1, wherein removing the one or more reflections comprises cropping the first impulse response to remove the one or more reflections.

6. A method according to claim 1, wherein the predetermined audio signal comprises a chirp signal comprising a sine wave signal that is swept across frequency over time, and wherein receiving the audio signal comprises receiving audio signals in response to a plurality of chirp signals that are temporally separated by signal silence intervals.

7. A method according to claim 6, wherein estimating the first impulse response comprises determining a cross correlation between the audio signal received in response to the chirp signal and a time reversal of the chirp signal.

8. An apparatus comprising at least one processor and at least one memory including computer program code; the at least one memory and the computer program code configured to, with the at least one processor, cause the apparatus to:
   receive an audio signal in response to a predetermined audio signal provided by at least two audio source devices, wherein receiving the audio signal comprises receiving audio signals from the at least two audio source devices with the audio signals being separated by a silence interval;
   for the audio signal received in response to the predetermined audio signal provided by each respective audio source device of the at least two audio source devices, estimate a first impulse response between the respective audio source device and the receiver based at least in part upon the audio signal received in response to the predetermined audio signal provided by the respective audio source device;
   for the first impulse response estimated between each respective audio source device of the at least two audio source devices and a receiver, remove one or more reflections from the first impulse response to create direct path information; and
   determine a location of the receiver based at least in part upon the direct path information created from the first impulse response estimated between each respective audio source device of the at least two audio source devices and the receiver.

9. An apparatus according to claim 8, wherein the at least one memory and the computer program code are further configured to, with the at least one processor, cause the apparatus to determine a second impulse response based at least in part upon the direct path information created from the first impulse response estimated between each respective audio source device of the at least two audio source devices and the receiver, wherein the at least one memory and the computer program code are configured to, with the at least one processor, cause the apparatus to determine the location of the receiver by determining an angle of arrival of the audio signal based at least in part upon the second impulse response.

10. An apparatus according to claim 8, wherein the at least one memory and the computer program code are configured to, with the at least one processor, cause the apparatus to determine the second impulse response by determining the second impulse response based upon a combination of the direct path information and a tonal signal at a frequency associated with the audio signal.

11. An apparatus according to claim 8, wherein the at least one memory and the computer program code are configured to, with the at least one processor, cause the apparatus to remove one or more reflections from the first impulse response to create direct path information by removing one or more reflections from the first impulse response to create a direct path impulse response, wherein the at least one memory and the computer program code are further configured to, with the at least one processor, cause the apparatus to determine a peak of the direct path impulse response, and wherein the at least one memory and the computer program code are configured to, with the at least one processor, cause the apparatus to determine the location of the receiver by determining a time of arrival of the audio signal based at least in part upon the peak of the direct path impulse response.

12. An apparatus according to claim 8, wherein the at least one memory and the computer program code are configured to, with the at least one processor, cause the apparatus to remove the one or more reflections by cropping the first impulse response to remove the one or more reflections.

13. An apparatus according to claim 8, wherein the predetermined audio signal comprises a chirp signal comprising a sine wave signal that is swept across frequency over time, and wherein the at least one memory and the computer program code are configured to, with the at least one processor, cause the apparatus to receive the audio signal by receiving audio signals in response to a plurality of chirp signals that are temporally separated by signal silence intervals.

14. An apparatus according to claim 13, wherein the at least one memory and the computer program code are configured to, with the at least one processor, cause the apparatus to estimate the first impulse response by determining a cross correlation between the audio signal received in response to the chirp signal and a time reversal of the chirp signal.

15. A system comprising:
a plurality of audio source devices, each audio source device configured to transmit a predetermined audio signal;
a receiver configured to receive an audio signal in response to the predetermined audio signals provided by the plurality of audio source devices, wherein receiving the audio signal comprises receiving audio signals from the at least two audio source devices with the audio signals being separated by a silence interval; and
at least one processor configured to:
estimate a first impulse response between each respective audio source device and the receiver based at least in part upon the audio signal received in response to the predetermined audio signals;
remove one or more reflections from the first impulse response to create a direct path information; and
determine a location of the receiver based at least in part upon the direct path information.

16. A system according to claim 15, wherein the predetermined audio signal comprises a chirp signal comprising a sine wave signal that is swept across frequency over time, and wherein each audio source device is configured to transmit a plurality of chirp signals that are temporally separated by signal silence intervals.

17. A system according to claim 16, wherein the chirp signal comprises one of an acoustic signal or an ultrasonic signal.

18. A system according to claim 15, wherein the at least one processor is further configured to determine a second impulse response based at least in part upon the direct path information, and wherein the at least one processor is configured to determine the location of the receiver by determining an angle of arrival of the audio signal based at least in part upon the second impulse response.

19. A system according to claim 18, wherein the receiver comprises a plurality of sensors, and wherein each sensor is configured to receive the audio signal in response to the predetermined audio signals provided by the plurality of audio source devices.

20. A system according to claim 15, wherein the at least one processor is configured to cause the apparatus to remove one or more reflections from the first impulse response to create direct path information by removing one or more reflections from the first impulse response to create a direct path impulse response, wherein the at least one processor is further configured to cause the apparatus to determine a peak of the direct path impulse response, and wherein the at least one processor is configured to cause the apparatus to determine the location of the receiver by determining a time of arrival of the audio signal based at least in part upon the peak of the direct path impulse response.

* * * * *